Oct. 13, 1925.

J. SCHUMACHER 1,557,345

PILE CUTTER

Filed Jan. 17. 1924

WITNESSES

INVENTOR
JULIUS SCHUMACHER

BY

ATTORNEYS

Oct. 13, 1925.

J. SCHUMACHER

PILE CUTTER

Filed Jan. 17, 1924

WITNESSES

INVENTOR
JULIUS SCHUMACHER

BY

ATTORNEYS

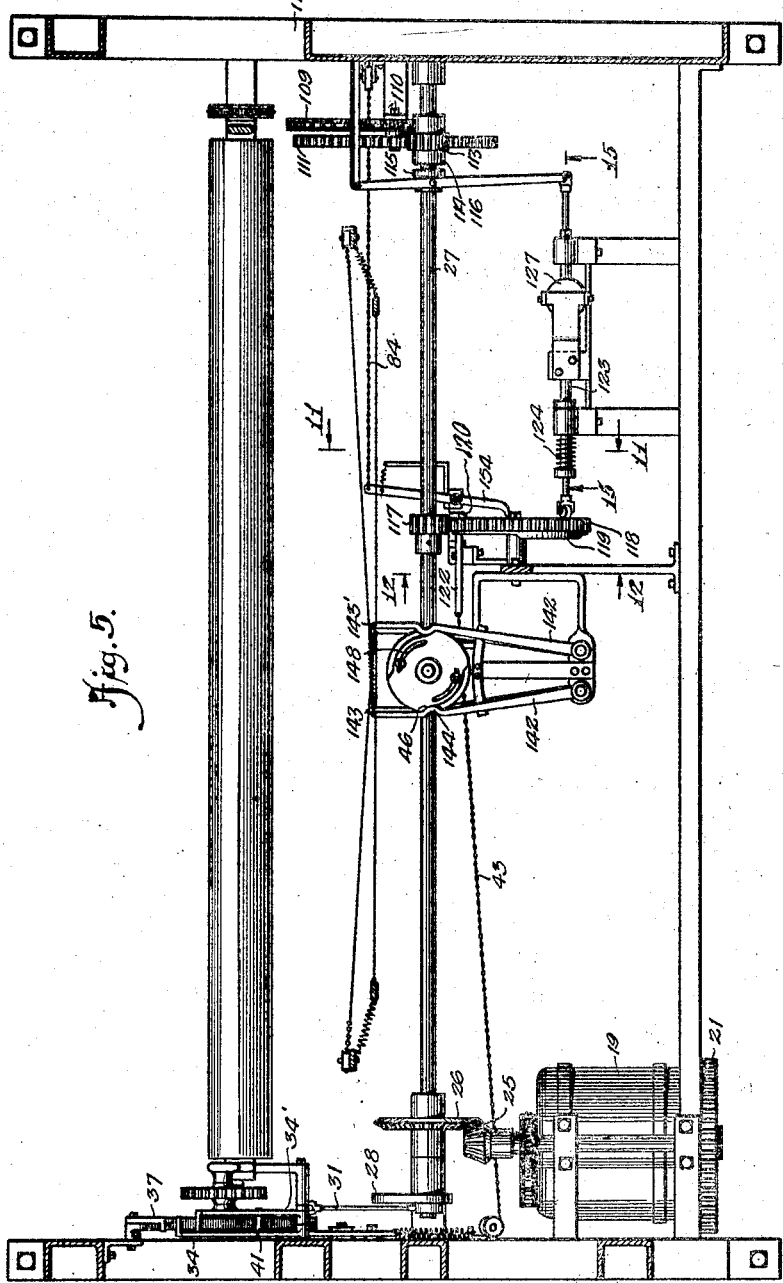

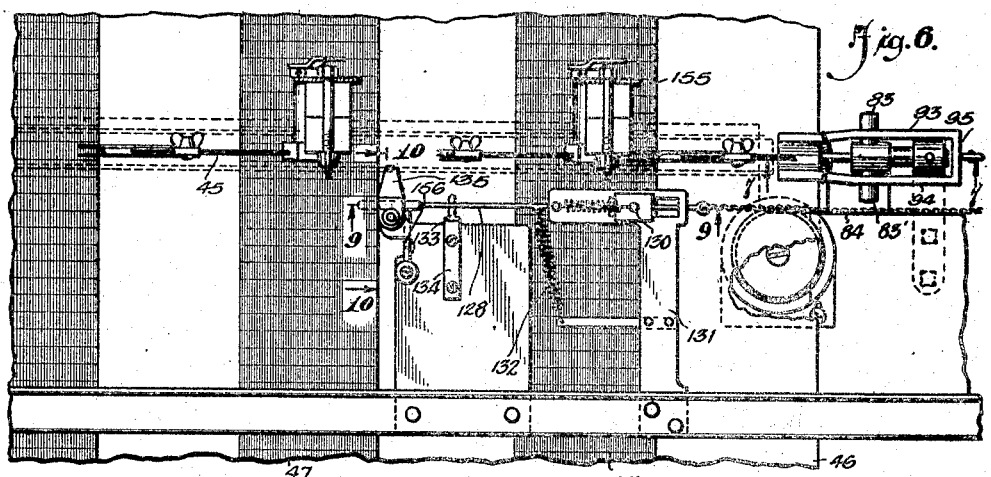
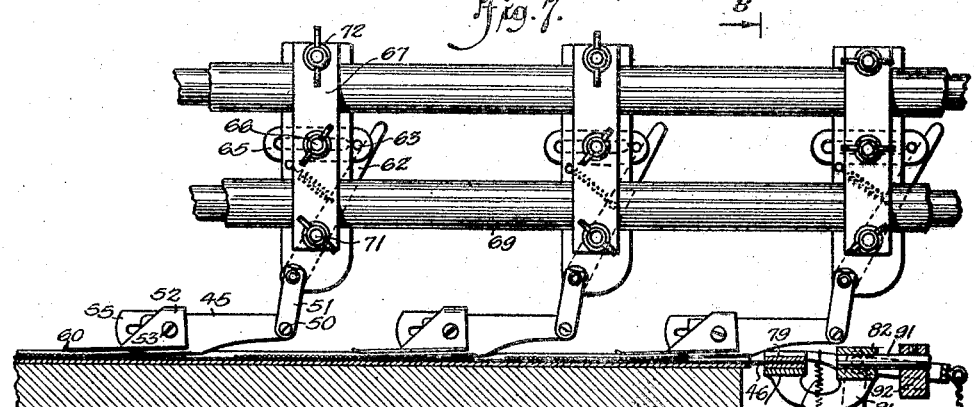
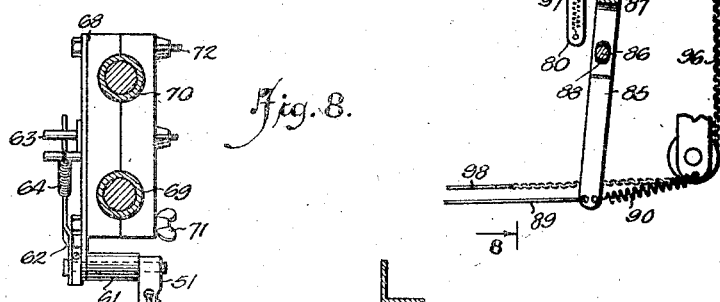
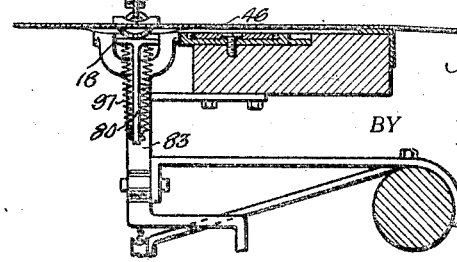

Oct. 13, 1925.  1,557,345
J. SCHUMACHER
PILE CUTTER
Filed Jan. 17, 1924  8 Sheets-Sheet 7
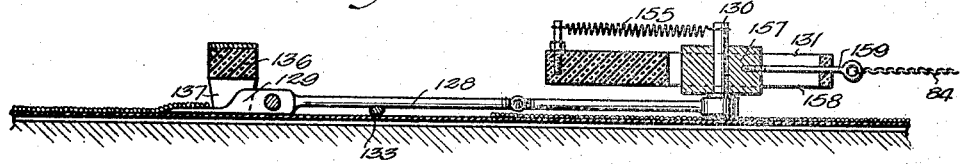
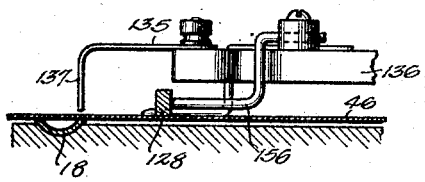
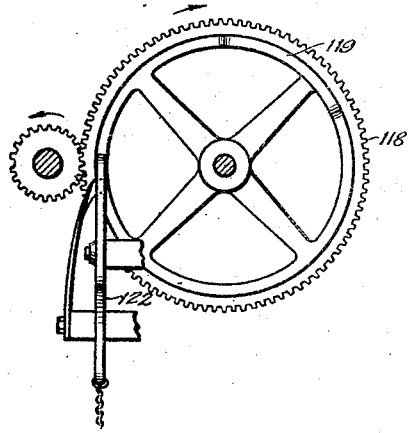
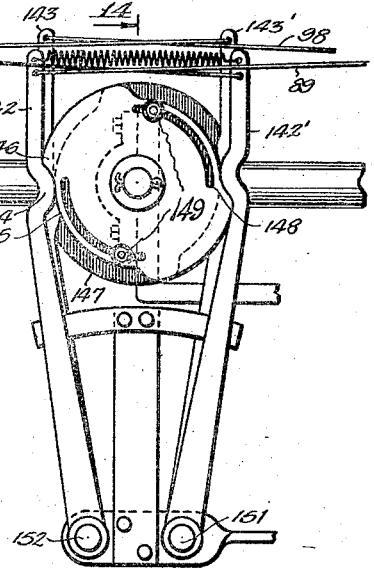
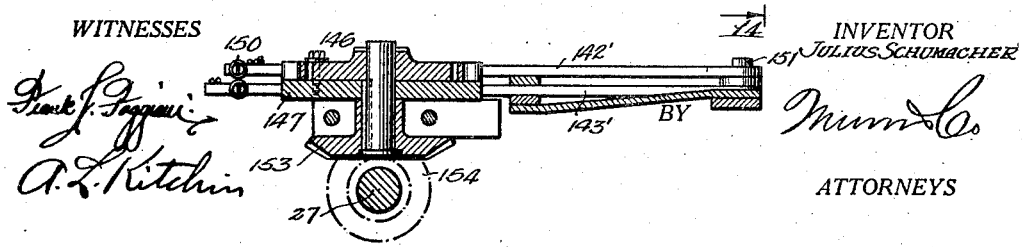
INVENTOR
JULIUS SCHUMACHER
ATTORNEYS Oct. 13, 1925.
J. SCHUMACHER
PILE CUTTER
Filed Jan. 17, 1924
1,557,345
8 Sheets-Sheet 8
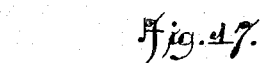
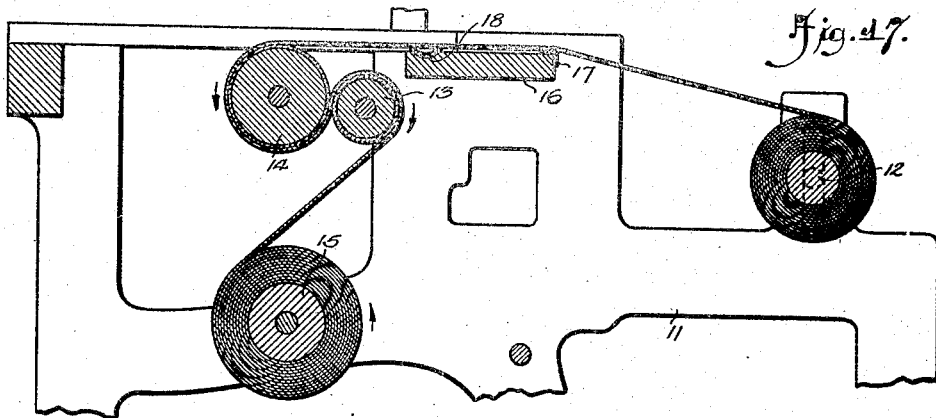
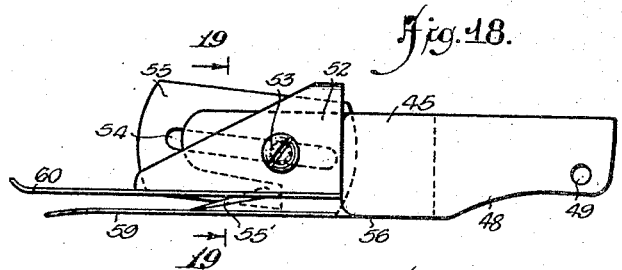
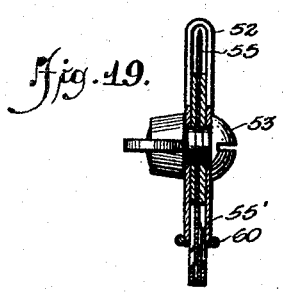
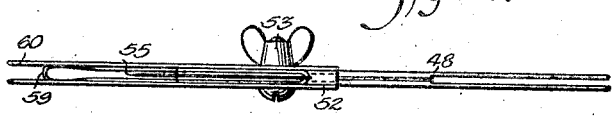
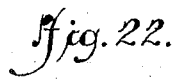
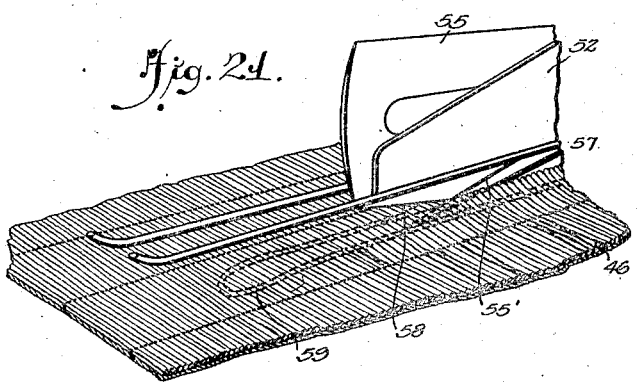
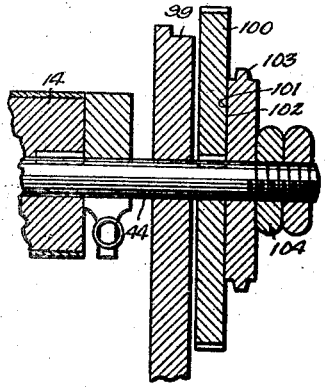
WITNESSES
INVENTOR
JULIUS SCHUMACHER
BY
ATTORNEYS Patented Oct. 13, 1925.

1,557,345

UNITED STATES PATENT OFFICE.

JULIUS SCHUMACHER, OF WEST HOBOKEN, NEW JERSEY.

PILE CUTTER.

Application filed January 17, 1924. Serial No. 686,905.

*To all whom it may concern:*

Be it known that I, JULIUS SCHUMACHER, a citizen of the United States, and a resident of West Hoboken, in the county of Hudson and State of New Jersey, have invented a new and Improved Pile Cutter, of which the following is a full, clear, and exact description.

This invention relates to machines for partly finishing cloth and particularly for cutting the piles of pile fabric automatically as it is moved from one set of piles to another.

The object of the invention is to provide a machine which will automatically cut the piles of pile fabric when arranged to extend entirely across a piece of fabric or when arranged in segregated rows.

Another object of the invention is to provide a pile cutter wherein the fabric is automatically adjusted at certain intervals to insure the proper cutting of the fabric as it passes through the machine.

A further object of the invention, more specifically, is to provide a machine having a series of knives capable of adjustment so that one or all knives may be operated for cutting all or part of the pile as the cloth moves through the machine.

In the accompanying drawings—

Figure 5 is a horizontal sectional view through Figure 2, approximately on line 5—5.

Figure 6 is an enlarged fragmentary top plan view showing a strip of cloth, several cutting members and associated parts for illustrating how the cutting members and associated parts function to produce the desired cutting action and the desired adjustment of the cloth.

Figure 7 is an enlarged sectional view through Figure 6, approximately on line 7—7.

Figure 8 is a fragmentary sectional view through Figure 7 on line 8—8.

Figure 9 is an enlarged fragmentary longitudinal sectional view through Figure 6, approximately on line 9—9.

Figure 10 is an enlarged fragmentary sectional view through Figure 6 on line 10—10.

Figure 11 is an enlarged fragmentary sectional view through Figure 5 on line 11—11.

Figure 12 is an enlarged fragmentary sectional view through Figure 5 on line 12—12.

Figure 13 is an enlarged fragmentary top plan view of certain cams shown in Figure 5.

Figure 14 is a sectional view through Figure 13 on line 14—14.

Figure 17 is a fragmentary transverse sectional view through the frame of the machine shown in Figure 1, together with certain rollers and associated parts illustrating the path of movement of the cloth.

Figure 18 is a side view on an enlarged scale, of one of the cutters shown in Figures 6 and 7.

Figure 19 is a sectional view through Figure 18 on line 19—19, the same being on an enlarged scale.

Figure 20 is a top plan view of the structure shown in Figure 18.

Figure 21 is an enlarged fragmentary perspective view showing part of a strip of cloth and cutter embodying the invention associated therewith, in cutting position.

Figure 22 is a detail fragmentary sectional view showing the driving mechanism at one end of the machine.

Figure 1:
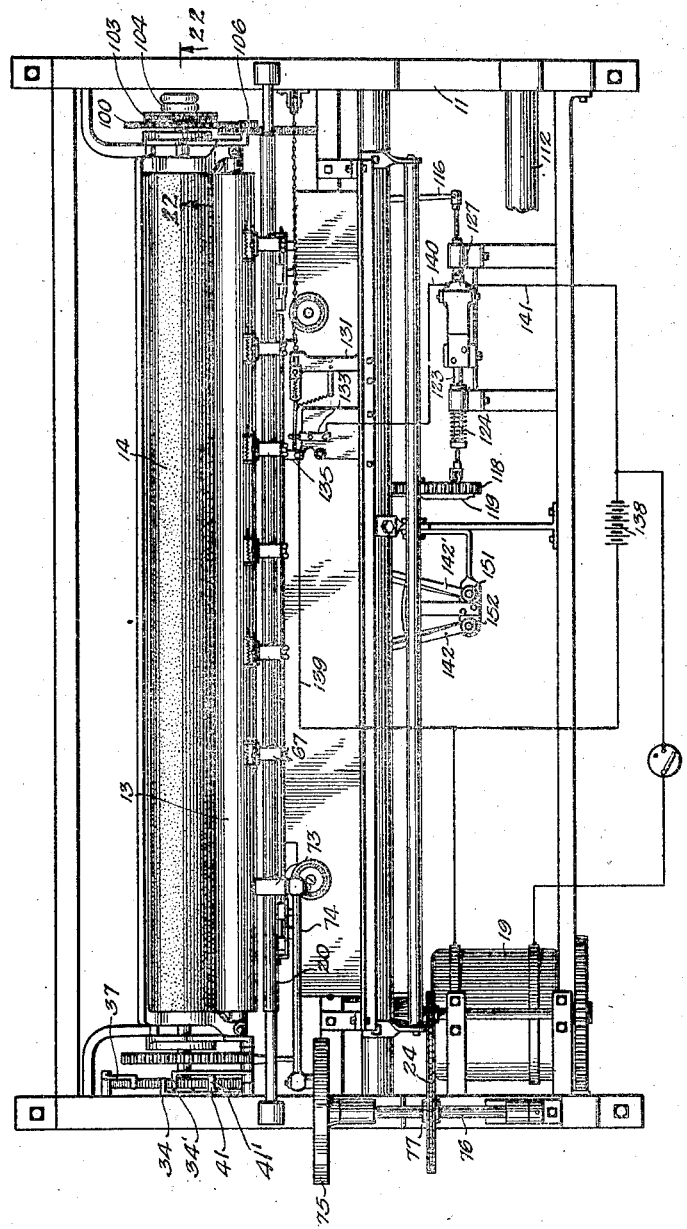
Figure 1 is a top plan view of the machine, embodying the invention, part of the cloth supply roller being broken away.
Figure 2:
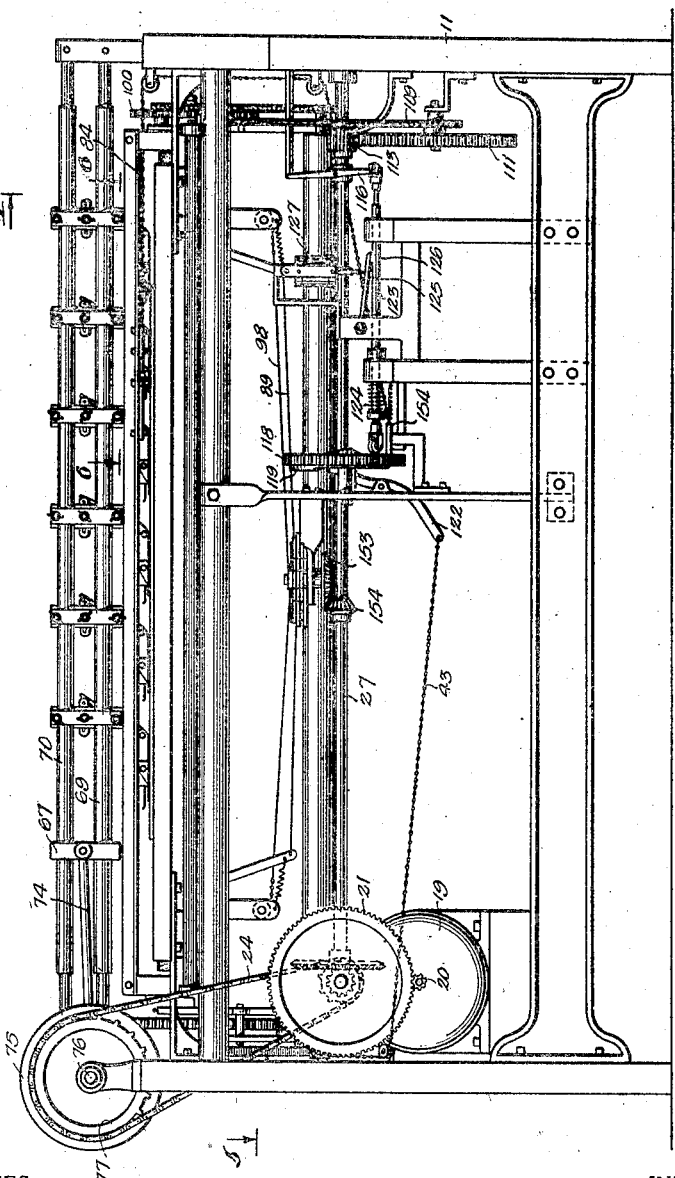
Figure 2 is a front view of the structure shown in Figure 1.

Referring to the accompanying drawings by numeral, 11 indicates a frame of any desired kind provided with suitable braces and connecting parts for supporting the various brackets and moving parts hereinafter fully described. On the frame 11 is mounted in any desired manner rollers 12, 13, 14 and 15 (Figure 17), said rollers accommodating the cloth as it is being operated upon. As indicated in this figure, the cloth on roller 12 is in its unfinished condition, namely, with the piles uncut. It passes upwardly and over a table 16 which preferably has a metal guiding edge 17 and a grooved member 18 and from thence over the various rollers 14, 13 and 15, but has the pile cut as it passes over the grooved portion 18. The roller 13 acts in the capacity of a tension roller while the roller 14 acts as a feed roller and is driven intermittently as hereinafter fully described so that the finished cloth with the pile cut is wound on the roller 15.

Figure 3:
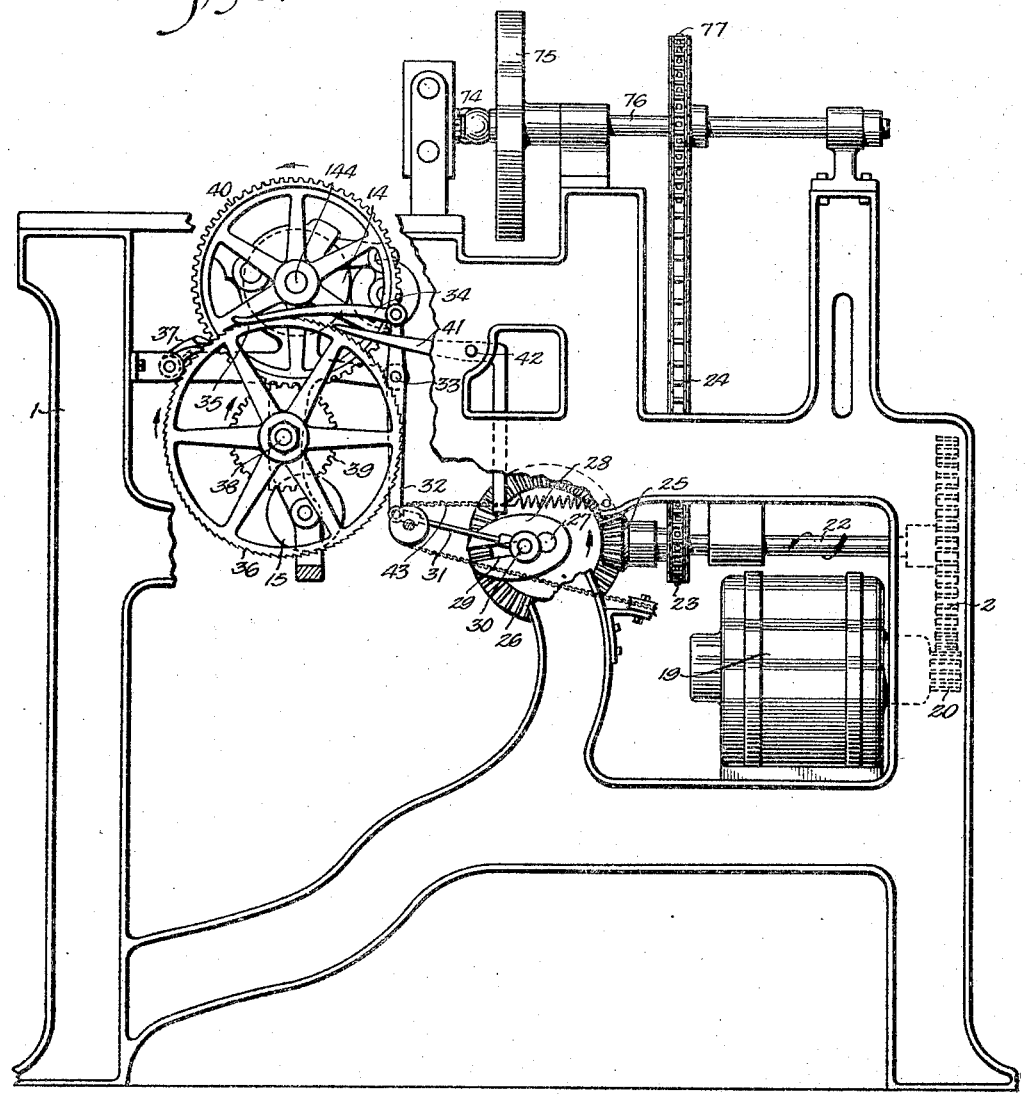
Figure 3 is an end view of the structure shown in Figure 1, with part of the frame broken away for better illustrating the driving mechanism.

In Figure 3 particularly, is shown means for driving the roller 14. Referring particularly to this figure, 19 is an electric motor provided with a suitable pinion 20 meshing with the gear wheel 21 rigidly secured to the shaft 22, which shaft is provided with a sprocket wheel 23 for driving the chain 24, which chain operates mechanism hereinafter fully described. The shaft 22 is provided with a pinion 25 continually meshing with the bevel gear 26 which is rigidly secured to the shaft 27 for rotating said shaft. A cam 28 is rigidly secured to shaft 27 and is moved thereby, said cam having a slot 29 for receiving the pin 30, which pin is locked at any desired point along the slot by a suitable clamping nut or other suitable means. A link 31 is pivotally mounted on the pin 30 and is in turn pivotally connected with a lever 32 pivotally mounted on a fixed support 33. A pawl 34 is pivotally connected with the upper end of lever 32, said pawl having a projecting tooth 35 adapted to engage the ratchet wheel 36 so as to pull the same a given distance upon each revolution of the cam 28 and shaft 27. A pawl 37 is pivotally mounted on a suitable support on the frame 1 and acts to prevent any reverse movement of the ratchet wheel 36. The ratchet wheel 36 is mounted on a shaft 38 to which the pinion 39 is rigidly secured, said pinion continually meshing with the gear wheel 40.

From Figure 1, it will be noted that a second pawl 34' is connected with the lever 32, said pawl being provided with a suitable tooth for engaging the ratchet wheel 36, said tooth being set to engage one of the teeth while the tooth 35 of the pawl 34 is half way between two teeth. In this way, there will be practically no lost motion and the ratchet wheel will receive the full benefit of the action of the cam 28. A fourth pawl 41 is provided with a tooth adapted to engage the ratchet wheel 36, said pawl being pivotally mounted at 42 and actuated by the chain 43 operated by mechanism hereinafter fully described.

The gear wheel 40 is rigidly secured to the shaft 44, which in turn is rigidly connected with the roller 14 whereby said roller is rotated intermittently by the mechanism shown in Figure 3. It will be noted, however, that the construction is such that the roller may be rotated from the opposite end and the parts shown in Figure 3, will merely slip. The pin 30 is adjusted to cause the parts to move the exact distance as near as possible of the distance between two adjacent piles so that the cloth will be moved forward the proper distance each time so as to be operated on properly by the various cutters 45.

As shown in Figures 6 and 7, the cloth 46 is formed with strips of pile 47 and, consequently, the various cutters 45 are spaced apart the proper distance to cut the piles of these various strips. Where the piles are wider, the parts are adjusted to suit the conditions. From these figures and also from Figures 18 to 21, it will be noted that the various cutters 45 are each provided with a supporting body or frame 48 which consists of two flat pieces of metal apertured at 49 for receiving the screw 50 whereby the cutters are connected to the supporting links 51. Each of the cutters is provided with a U-shaped straddling member 52 held in place by a suitable clamping bolt 53 which passes through an aperture in the body 48 and through the slot 54 in the knife 55. The plates or body 48 are preferably formed by constructing the body from a flat piece of metal and bending the same along a central line so that the lower edge 56 is connected or formed integral and the front is notched for forming a pair of guiding members 57 for guiding the cloth as shown in Figure 21 against the edge 58 of the knife 55. Rigidly secured to one of the edges 57 by solder or otherwise, is an auxiliary knife 55' arranged at an angle to the bottom edge 56 and also at the opposite angle to the lower edge of the knife 55. In order to assist the members 57 in this guiding action, a looped wire 59 is welded or otherwise secured to the bottom edge 56 and extends an appreciable distance beyond the member 57 with the front ends slightly inclined downwardly as shown in Figure 18. To prevent the pawl or any part of the clutch from riding too high, a pair of guiding fingers 60 is welded or otherwise rigidly secured to the straddling member 52. By reason of this member and the fingers 60, the pile is guided directly against the cutting edge 58 and as the cutter is moved along, the pile will be properly cut with a shearing action.

The various cutters are mounted as shown particularly in Figures 6, 7 and 8, namely, on the links 51, which links are bolted or otherwise rigidly secured to a horizontal member 61 which in turn is rigidly secured in any desired manner to the lever 62. This lever is held against the pin or stop 63 by a suitable spring 64 whereby the cutters are maintained at the proper angle but may be quickly raised at any time by depressing the upper end of the lever 62. The pin 63 may be adjusted to suit circumstances by shifting the slotted plate 65 through which the clamping screw 66 extends, said clamping screw also passing through the plate 67. Plates 67 and 68 are clamped to the sleeves 69 and 70 by suitable clamping screws 71 and 72 whereby these parts may be adjusted along the sleeves 69 and 70 to any desired extent for adjusting the position of the various cutters. It is evident that the sleeves 69 and 70 could carry only one cutter or could carry a large number as might be preferred or required. In order to give a proper reciprocatory movement to the cutters, a bracket 73 (Figure 1) is clamped by suitable screws or otherwise to the sleeves 69 and 70. A link 74 is pivotally connected with bracket 73 and is also pivotally connected to the disk 75 by a suitable wrist pin, said disk 75 being rigidly secured to shaft 76 (Figures 1 and 3), which shaft carries a sprocket wheel 77 adapted to accommodate the chain 24 operated by sprocket wheel 23 from shaft 22. It will thus be noted that the reciprocatory motion of the sleeves 69 and 70 is constant though power is taken off from shaft 22 for intermittently moving the roller 14. After the cutters 45 have moved in one direction for cutting the pile once, the cutters are withdrawn to their former position and during this withdrawing action, the cloth is moved forward the distance of one pile so that the next forward movement of the cutters will cause them to operate on the next pile and so on until the entire pile section has been cut. This intermittent forward movement is caused by the roller 14. In addition to moving the cloth 46 forwardly step by step, the cloth is stretched laterally upon each cutting action of the cutters 45. This lateral stretching is produced by mechanism operating at opposite ends of the machine but as both ends are identical, the description of one as shown in Figures 6, 7 and 8, will explain the entire operation.

As illustrated in these figures, a gripping structure is provided which is formed with jaws 78 and 79 adapted to grip the cloth near the edge. The jaw 78 is provided with a downward extending projection 80 and a rearward extending arm 81 formed with a tubular enlargement 82 having lateral extending pins 83 and 83'. A bifurcated lever 85 is pivotally mounted at 86 and is arranged with the bifurcated arms 87 fitting onto the pins 83 and 83'. The slot 88 for accommodating the pin 86 is somewhat elongated to allow certain loose motion whereby as the lever is pulled either by the rod or wire 89 or the spring 90, said lever may freely act to slide the sleeve 82 over the guiding pin 91 held in the fixed bracket 92 by any suitable means, as for instance, a set screw. The jaw 78 is provided with rearward extending arms 93 and 94 which are pivotally mounted on the pins 83 and 83' and which are preferably connected together by a bar 95 to which the chain 96 is secured. A spring 97 is connected with the arm 80 and with the arms 93 and 94 for normally holding the jaw 79 against the jaw 78. When the chain 96 is pulled by the actuation of the rod or wire 98, arms 93 and 94 will be moved for raising jaw 79 whereby the cloth 46 may freely move. As soon as the cloth has moved the desired distance, the rod or wire 98 is released and springs 97 will act to cause the jaws to tightly grip the cloth so that as the lever 85 is moved, the cloth will be pulled transversely so that the parts will be properly stretched in order that the pile may be properly cut.

When the cloth is first inserted into the machine, it is correctly positioned so that the various cutters will easily and accurately operate to cut the pile. However, as the machine operates, the pile begins to get slightly out of alignment by reason of the stretching of the ends and the possible slipping of the parts so that it is necessary to again align up the pile with the cutters in order that a substantially central cut may be made for each section of piling. To do this manually each time that the piling got out of align would be unprofitable and, consequently, means have been provided for causing a proper alignment of the piling with the cutters upon each fourth movement of the cloth, though if desired, the parts could be arranged to cause it to be re-aligned more often or re-aligned less often. The mechanism shown in Figure 3, as heretofore described, moves the parts so that the cloth will move substantially the distance of one pile or one pile section but sometimes this movement is irregular as just described and, consequently, at stated intervals, as for instance, every fourth movement, the mechanism shown in Figure 3 is thrown out of operation and the mechanism at the opposite end of the machine is thrown into operation and is caused to operate in such a manner as to bring the piling back into proper alignment. The machine then operates from the end shown in Figure 3 until the proper time has come for the opposite end to work. This action continues as long as the cloth is passed through the machine so that at stated intervals the piling is re-aligned and, consequently, the cutters will continually act in a proper manner for cutting the pile. The re-aligning is brought about by the construction shown more particularly in Figures 1, 5, 11 and 12.

Figure 4:
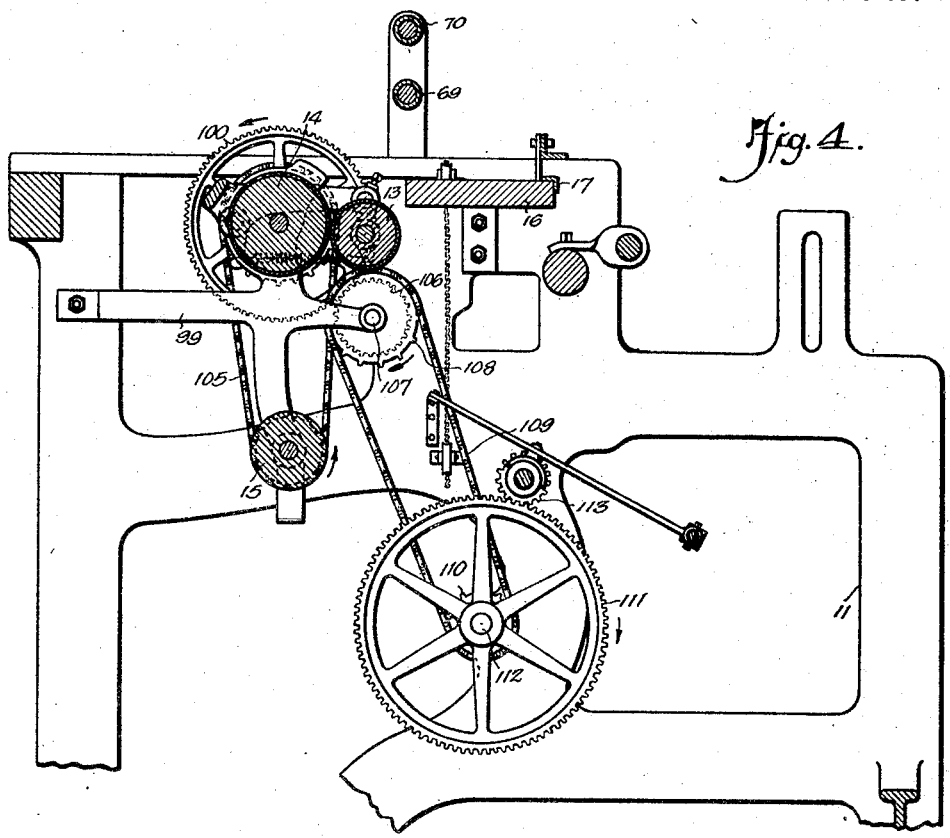
Figure 4 is a fragmentary sectional view through Figure 2, approximately on line 4—4.

As indicated in Figures 1 and 22, the roller 14 is secured to the shaft 44 supported in a suitable bracket 99 and carrying a gear wheel 100 keyed or otherwise rigidly secured thereto. The gear wheel 100 has a friction surface 101 co-acting with the friction surface 102 of the sprocket wheel 103. The nuts 104 act to produce a friction between these friction surfaces so that the sprocket wheel 103 is clutched in a limited sense to the gear wheel 100 so as to drive the chain 105 which in turn drives the roller 15 on which the finished cloth is wound. As the roll on the roller 15 increases in size, the sprocket wheel 103 will slip and, consequently, will maintain only a proper tension on the cloth without any tendency to break the same. The gear wheel 100 continually meshes with the pinion 106 which is secured to a shaft 107 mounted on the bracket 99, said pinion 106 being rigidly connected in any desired manner with the sprocket wheel 108 carrying the chain 109. The chain 109 passes over a sprocket wheel 110, which sprocket wheel is rigidly secured to the gear wheel 111. The gear wheel 111 and the sprocket wheel 110 are both mounted on a shaft 112 secured to a suitable drive connected with the frame 11. The gear wheel 111 (Figure 4) is continually in mesh with the pinion 113, which pinion is loosely mounted on the shaft 27, which shaft is continually rotated through the pinion 25 and gear 26. The pinion 113 is supplied with a clutch member 114 co-acting with the clutch member 115 splined on shaft 27 and actuated by the lever 116.

From the construction just described, it will be noted that the gear wheel 100 is actuated through pinion 113 and associated parts only when the clutch member 115 is engaging the clutch member 114. In order to cause these clutch members to engage and to operate the roller 14 through the pinion 113 and associated parts, the end of the machine shown in Figure 3 is thrown out of operation at or near the end of the third pile cut so that on the fourth pile the roller 14 is moved through pinion 113 and associated parts.

Figure 15:
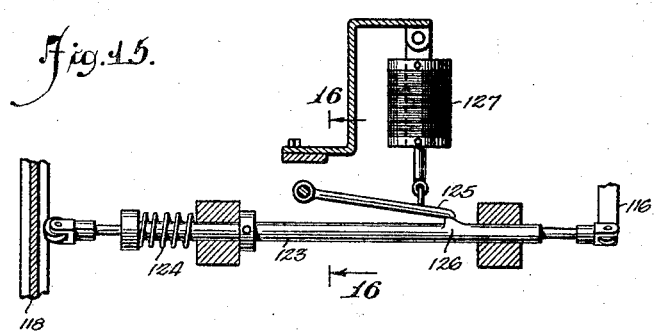
Figure 15 is an enlarged fragmentary sectional view through Figure 5, approximately on line 15—15.
Figure 16:
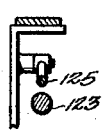
Figure 16 is a fragmentary sectional view through Figure 15 on line 16—16.

As indicated in Figure 5, the shaft 27 is provided with a pinion 117 continually meshing with the gear wheel 118, which gear wheel is provided with a cam 119 on one side and with a pair of cams 120 and 121 on the opposite side. When the cam 119 moves around to the proper point, it will engage and move the bell crank lever 122 for pulling the chain 43, which chain will operate the lever or pawl 41, which lever or pawl is provided with a laterally extending projection 41' adapted to engage the pawls 34 and 34', and raise them out of engagement with the ratchet wheel 36 so that as they move they will not rotate the ratchet wheel. While the cam 119 is functioning to hold the pawls 34 and 34' out of operation, cam 120 will function to move the rod 123 (Figure 15) against the spring 124 for shifting the lever 116 to which it is connected. As the rod 123 is shifted for causing the clutch members 114 and 115 to engage, the pawl or lock 125 will drop down and engage the shoulder 126 so as to prevent the return of rod 123 after the cam 120 has passed. This cam is a very short cam and, consequently, passes almost instantly so that the clutch members 114 and 115 would almost instantly disengage were it not for the locking pawl 125. The locking pawl 125, therefore, holds these clutch members in engagement and, consequently, will permit the shaft 27 to operate the roller 14 through pinion 113, gear 111 and associated parts until the magnet 127 moves the pawl 125 out of engagement with the stop or lug 126 whereupon spring 124 will quickly move the parts for disengaging the clutch members 114 and 115. Shortly after this occurs, the cam 119 will have moved away from beneath the bell crank lever 122 and, consequently, the parts at the opposite end of the machine will be in position to function. In this way, the cloth is pulled an appreciable distance or a very short distance according to the time pawl 125 is engaging the shoulder 126.

The time of operation of the magnet 127 is determined by the action of the feeler arm 128 (Figures 6 and 9.) This feeler arm is provided with an enlargement 129 having a comparatively thin flat extension adapted to extend into the pile and be moved thereby. It will be noted that the arm 128 is pivotally mounted at 130 on the bracket 131 and is urged in a certain direction by the spring 132 while the cloth 46 pulls it in the opposite direction. The arm 128 is in continual contact with the extension 133 of the bracket 134 but is held out of contact with the bracket 135 by suitable insulating means 136 until the cloth moves the enlargement 129 against the depending end 137 of bracket 135 whereupon there will be a contact with the bracket, which bracket is made of metal and, consequently, there will be electrical connection between the bracket 134 and bracket 135.

As indicated in Figure 1, bracket 135 is connected to the source of current 138 by a conductor 139 while bracket 134 is connected to the windings of magnet 127 by a suitable conductor 140. A conductor 141 connects the magnet 127 with the source of current 138 on the opposite side of the conductor 139. By this construction and arrangement, whenever the arm 128 is moved over until it engages the end 137 of bracket 135, the circuit of magnet 127 will be closed and, consequently, this magnet will function to raise the pawl 125 for disconnecting the power from pinion 113 and associated parts. It will be noted that this occurs when the clutch 46 has been moved until the pawl is properly aligned whereby the cutters are again correctly centered.

In connection with the cutters, it will be noted that the trough or grooved portion 18 is arranged beneath the cutters so that they may press downwardly on the cloth and press the same somewhat into this groove so that the finger 59 may readily pass beneath the pile.

Referring again to the means shown in Figure 7 for stretching the cloth laterally, which means includes the rods or wires 89 and 98, it will be noted that these wires extend from opposite ends of the machine to near the center where the construction is provided as shown in Figures 5 and 13 for pulling these wires at the proper time. Referring particularly to these figures, it will be noted that the wires 89 and 98 are connected to the levers 142 and 143 respectively and the similar wires located at the opposite end of the machine are connected to the levers 142′ and 143′. As both sets of levers operate identical and are constructed identical, the description of one will apply to both. The levers 142 and 143 are provided with raised portions or cam surfaces 144 and 145 for engaging the respective cams 146 and 147, which cams are preferably of identical construction. The cam 146 is provided with a pair of arc-shaped slots 148 accommodating the respective bolts 149 extending into the cam 147 whereby the cams may be adjusted relative to each other in order to secure the proper pull on the various wires. Suitable springs 150 are connected to the various levers for holding them against their respective cams whereby when the cams are rotated, the levers will be properly swung on their pivotal mountings 151 and 152. The cam 147 is keyed or otherwise rigidly secured to the hub of a bevel gear 153 (Figure 14) which is continually meshing with a pinion 154 rigidly secured to the shaft 27. The shaft 27 continually rotates as long as the machine is in operation and, consequently, the levers 142 and 143 and associated parts will be actuated in proper time with the remaining parts.

It will be noted from Figure 5 that the shaft 27 rotates the gear wheel 119 through pinion 117 and that this gear wheel is provided with a cam 121 as heretofore described, which cam swings the lever 154 (Figures 5 and 11) whereby the chain 84 is pulled for pulling the pin 130 against the action of spring 155 and, consequently, for pulling the enlargement 129 of arm 128 out of the pile whereby spring 132 may quickly move the same back against the stop 156. The spring 155 is connected to a suitable pin on bracket 131 while the pin 130 is mounted in a sliding block 157 arranged in a slot 158 in bracket 131. A rod 159 connects the chain 84 with block 157 as shown in Figure 9. The cam 121 is properly timed to cause the withdrawal of the arm 128 at the proper time so that the cloth will not be retarded in its movement through the machine.

In operation, the cloth is placed on roller 12 and is threaded through the machine until one end is connected with roller 15 in any desired manner whereby it may be rolled on this roller when the same rotates. As the machine operates, roller 15 is rotated through the action of chain 105 (Figure 4) and as this chain is driven by sprocket wheel 103, a slipping action will be provided as the thickness of cloth increases on roller 15.

From Figure 17 it will be noted that the cloth is passed over roller 15 which merely acts as a tension roller. After the cloth has been properly positioned, the various cutters 45 are positioned substantially as shown in Figure 6 and the arm 128 is projecting into one of the pile sections. When the parts are in this position, motor 19 is started and shaft 27 and associated parts are driven. All of the parts are driven through this shaft except the disk 75 and associated parts which cause the knives to reciprocate. Upon each forward movement of the knives, a section of pile is cut for each cutter and then the cutters moved back to their former position. While this backward movement is taking place, the gripping members or jaws 78 and 79 (Figure 7) are released and the mechanism shown in Figure 3 is operated for moving the cloth forward one step. As the cutters reverse and start on their cutting stroke, the grippers 78 and 79 close and stretch the cloth laterally and hold the same stretched while the cutters perform the cutting operation. While this cutting operation is being performed, the cloth is not being moved as cam 28 is in its rear position and, consequently, is not causing the ratchet wheel 36 to be rotated. As the cloth is fed forward step by step, arm 128 will be moved toward the end 137 of the bracket 135 and as it touches this bracket, the magnet 127 will be energized. Before this takes place, the cam 120 (Figure 11) has functioned and, consequently, the cloth is being pulled from the end of the machine carrying gear wheel 100. The cloth is moved either a short distance or a long distance according to the time between the functioning of cam 120 and the contact of arm 128 with the end 137. This long or short pulling action will again align the pile sections so that the cutters may enter centrally of the respective pile sections and the end of arm 128 enter one of the advanced pile sections. This action is continued until all of the cloth has been operated upon, regardless of the length thereof.

What I claim is:—

1. In a pile cutting machine, means for guiding cloth through the machine from a supply roller to a receiving roller, a plurality of cutters adapted to move transversely of the cloth for cutting the pile as the cloth is passed through the machine, means for moving said cloth intermittently, means for reciprocating said cutters so as to cause them to perform a cutting operation while the cloth is stationary, and means for stretching the cloth adjacent the cutters at the time the cutters are functioning.

2. In a pile cutting machine, means for intermittently moving a strip of cloth through the machine, means for making successive cuts on the pile of the cloth as it is moved through the machine, said means functioning when the cloth is stationary, and means including clamps engaging the cloth on opposite sides and in alignment with said cutters for stretching the cloth during the time of functioning of the cutters.

3. In a pile cutting machine, means for guiding a strip of cloth as it is fed through the machine, intermittently operated means for intermittently moving said cloth, continuously operated means for moving said cloth, automatically acting means for throwing into operation the intermittently operated means for moving the cloth a predetermined distance and then automatically throwing the continuously operated means into operation for moving the cloth a predetermined distance, a cutter for cutting the pile on said cloth, and means for operating the cutter to cause the same to function when the cloth is stationary.

4. In a pile cutting machine, means for guiding a strip of cloth through the machine, intermittently operated means at one end of the machine for intermittently moving the cloth, continuously operated means at the opposite end of the machine for continuously moving the cloth, automatically actuated means for throwing either of the first mentioned means into operation, said automatically actuated means including a magnet release, a plurality of reciprocating cutters for cutting the fabric, and means for moving said cutters in their cutting movement while the fabric is stationary.

5. A pile cutting machine, comprising a framework, means for guiding a strip of cloth through the machine, means for intermittently feeding said strip forward, means for giving the strip a continuous short motion at spaced intervals for re-aligning the pile, a cutter for cutting the pile, means for actuating said cutter, and automatically controlled means for throwing into and out of operation the intermittently acting driving means and the continuously acting driving means.

6. In a pile cutting machine, means for feeding a strip of cloth through the machine, means for cutting the pile as the cloth is fed through the machine, a gripping member on each edge of the cloth and substantially in alignment with the means for cutting the pile, and automatically actuated means for causing said gripping members to grip the cloth and pull the same transversely upon each cutting operation.

7. In a pile cutting machine, means for feeding cloth through the machine, a cutter for cutting the pile on the cloth, means for actuating said cutter, and means acting at spaced intervals for adjusting the cloth longitudinally for re-aligning the pile.

8. In a pile cutting machine, a plurality of cutters, a pair of stationary rods spaced apart, a reciprocating sleeve mounted on each rod, a clamp for each cutter connected with said sleeves, means for reciprocating said sleeves, and means for adjustably connecting the cutters with said clamping members, said last mentioned means being adjustable for tilting the angle of cutting of the cutters.

9. In a pile cutting machine, means for moving a strip of fabric through the machine, means including a series of cutters for cutting the pile as the strip of cloth is moved through the machine, said cutters moving transversely of the strip of cloth, a gripper on each side of the cloth arranged substantially in line with the cutters, means for reciprocating said grippers, and means for automatically closing the grippers immediately before they are moved in one direction and opening the grippers as they are moved in the opposite direction.

10. In a pile cutting machine, a plurality of cutters, means for moving a strip of cloth through the machine, means for actuating said cutters so that they will cut the pile on said strip of cloth, said means moving the cutters transversely of the cloth, a gripper arranged on each side of the strip of cloth near the cutters, means including a pivotally mounted arm for opening said grippers, a spring for closing the grippers and means including a pivotally mounted lever for reciprocating the grippers, said last mentioned means operating substantially at the time the cutters are cutting the pile whereby the cloth will be stretched during the cutting operation.

11. In a pile cutting machine, means for stretching the cloth during the cutting operation, said means including a pair of gripping members for gripping opposite edges of the cloth, a pivotally mounted lever for reciprocating the gripping members, and a guiding pin carried by the gripping members for guiding the gripping members.

12. In a pile cutting machine, means for passing a strip of cloth through the machine, a plurality of cutters for cutting the pile thereon, gripping members adapted to grip the opposite edges of the cloth simultaneously and pull the cloth transversely for stretching the same, and means for actuating said gripping means, said last mentioned means including a plurality of reciprocating members, a lever for actuating each of the reciprocating members, a double cam for each pair of levers, and means for continuously rotating said cams.

13. In a pile cutting machine, means for moving a strip of cloth through the machine, a plurality of cutters for cutting the pile on said strip of cloth, means for actuating said cutters and means for stretching the cloth laterally at the time that the cutters are functioning, said means including a gripping structure adapted to engage each edge of the cloth substantially in line with the cutters, a plurality of reciprocating members for actuating the gripping structures, a pivotally mounted lever for each of the reciprocating members adapted to move the reciprocating members in one direction, springs for moving the reciprocating members in the opposite direction, a continuously rotating cam for each pair of levers, said cams being adjustable in respect to each other, and means for rotating said cams.

JULIUS SCHUMACHER.